US006240325B1

United States Patent
Brundisini

(10) Patent No.: US 6,240,325 B1
(45) Date of Patent: May 29, 2001

(54) ELECTRONIC CONTROL UNIT WITH MODIFIABLE PRE-SET PROGRAMS FOR THE CONTROL OF AUTOMATIC WATERING SYSTEMS WITH PLURAL LINES

(75) Inventor: Andrea Brundisini, Pordenone (IT)

(73) Assignee: Claber S.p.A., Fiume Vento (IT)

( * ) Notice: Subject to any disclaimer, the term of this patent is extended or adjusted under 35 U.S.C. 154(b) by 0 days.

(21) Appl. No.: 09/086,594

(22) Filed: May 29, 1998

(30) Foreign Application Priority Data

May 29, 1997 (IT) ............................................. MI97A1259

(51) Int. Cl.[7] ................................................... G05B 11/01
(52) U.S. Cl. ................................. 700/19; 700/16; 700/17; 700/18; 700/284; 239/64; 239/69; 239/70; 379/10; 379/14; 379/29; 379/324
(58) Field of Search ................................. 700/19, 16, 17, 700/18, 284; 239/64, 69, 70; 137/624.11, 624.2; 379/10, 14, 29, 324

(56) References Cited

U.S. PATENT DOCUMENTS

| 4,454,505 | 6/1984 | Harney et al. ....................... 340/712 |
| 4,661,719 | 4/1987 | Burchfiel et al. ...................... 307/38 |
| 4,937,732 | * 6/1990 | Brundisini .............................. 700/16 |
| 4,993,640 | * 2/1991 | Baugh .................................... 239/64 |
| 5,251,153 | * 10/1993 | Nielsen et al. ........................ 364/550 |
| 5,363,290 | * 11/1994 | Doup et al. ............................ 700/16 |
| 5,479,338 | * 12/1995 | Ericksen et al. ....................... 700/16 |

FOREIGN PATENT DOCUMENTS

| 0703516 | 3/1996 | (EP) . |
| 0748584 | 12/1996 | (EP) . |
| 0821433 | 1/1998 | (EP) . |
| MI96/001563 | 7/1996 | (IT) . |

* cited by examiner

*Primary Examiner*—Ayaz Sheikh
*Assistant Examiner*—Frantz Blanchard Jean
(74) *Attorney, Agent, or Firm*—Jacobson, Price, Holman & Stern, PLLC

(57) ABSTRACT

An electronic control unit for the control of automatic watering systems having plural lines comprising an electronic circuit with a programmable processing unit for the control of a plurality of different watering lines. A manually operated selector, preferably of the rotary type, is provided, that is settable in a plurality of selectionable positions, to each one of which a specific watering cycle for the lines corresponds. By acting on the selector and on a start button, it is possible to modify the programming of the processing unit in order to associate with each single line a respective watering cycle different from the ones otherwise selectable by means of the selector.

9 Claims, 4 Drawing Sheets

ELECTRONIC CONTROL UNIT WITH MODIFIABLE PRE-SET PROGRAMS FOR THE CONTROL OF AUTOMATIC WATERING SYSTEMS WITH PLURAL LINES

TITLE OF THE INVENTION

"Electronic control unit with modifiable pre-set programs for the control of automatic watering systems with plural lines"

BACKGROUND OF THE INVENTION

The present invention refers to an electronic control unit with modifiable pre-set programs for the control of automatic watering systems having plural lines.

The increasing demand for watering systems capable to activate and to disconnect themselves at programmable pre-fixed intervals and for time lengths is known.

This gave rise to a corresponding increase in the designing of electronic control units for the control of the aforementioned systems.

Among the control units with easiest employment by the user there is the one described in the European patent application EP-A-0748584 of the same applicant, in which a rotary selector that at the time of its utilisation can be positioned in a plurality of different angular positions, each one corresponding to the selection of a respective watering cycle, is provided.

With this type of control unit the user can avail beforehand of a certain number of watering cycles, among which the user can choose the most convenient one, simply by setting the rotary selector in the angular position corresponding to the desirable cycle, opportunely indicated by a numeric index and/or an inscription.

This known control unit is however suitable for the control of one watering line and more precisely of one electro-valve or other type of actuator.

In addition, the pre-set cycles are fixed and there is no possibility of their modification by the user.

On the other hand there is the development of a large market for control units capable to control plural watering lines and that provide for cycles modifiable according to the needs of the single user.

At the same time the ease of employment associated with the existence of pre-set cycles that do not require, for their pre-setting, the intervention of specialised personnel at the user's who purchased the control unit continues to be appreciated.

SUMMARY OF THE INVENTION

In view of the state of the art, object of the present invention has been to provide an electronic control unit, that would be suitable for the control of plural watering lines and, having a certain number of pre-set cycles, would however allow to modify those cycles so as to adjust them to the specific needs of the single user.

According to the invention, such object has been attained with an electronic control unit comprising an electronic circuit with a programmable processing unit and a manually operated selector positionable in a variety of selectionable positions, to each one of which a specific watering cycle corresponds, characterised in that said electronic circuit is arranged in such a way as to control in sequence a plurality of distinct watering lines and means are provided for modifying the programming of said processing unit so as to associate a respective watering cycle, different from the ones otherwise selectable by means of the selector, to each single line.

In this way, the user avails of a control unit utilisable for plural watering lines, with which he can select in an extremely simple and quick way any watering cycle comprised among a plurality of pre-set cycles. Besides, he has the possibility to disregard the pre-set cycles in favour of new cycles, possibly different for the different lines, which are more suitable for the particular needs of the system being controlled.

BRIEF DESCRIPTION OF THE DRAWINGS

The characteristics of the present invention will be better explained hereinafter by referring, as a non-limiting example, to the enclosed drawings, where.

DESCRIPTION OF THE INVENTION

Figure 1:
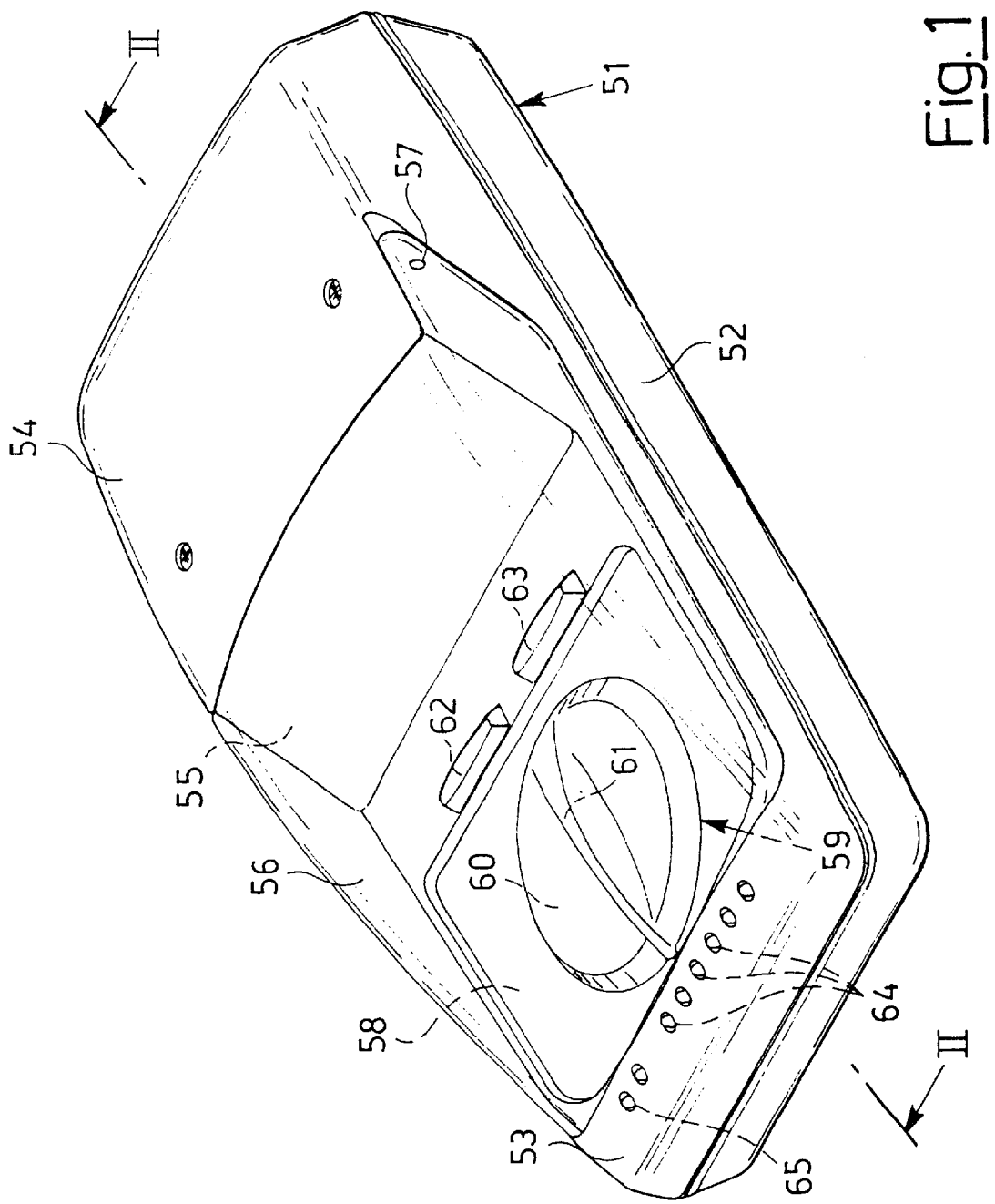
FIG. 1 shows a perspective view of a control unit according to the present invention.
Figure 2:
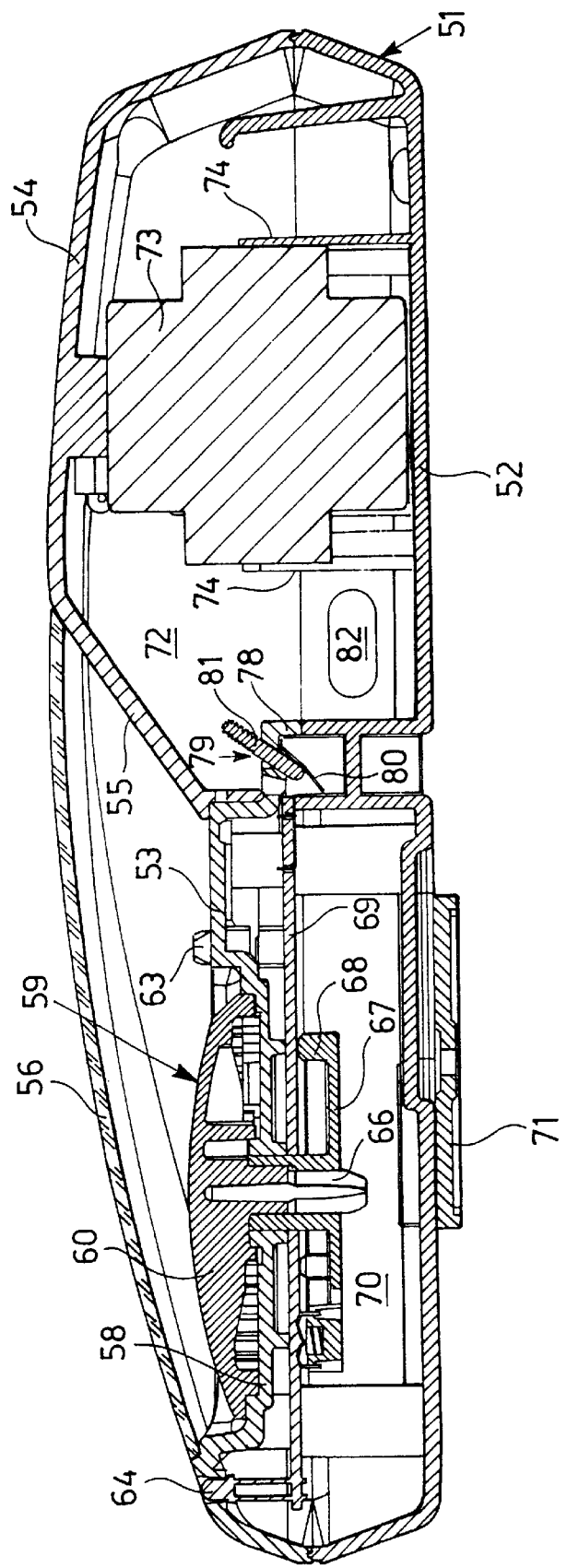
FIG. 2 shows the control unit in longitudinal section according to line II—II of FIG. 1.

The control unit shown in FIGS. 1–5 has a box casing 51 formed by a base 52, by a fore cover 53 of substantially flat shape and by a higher back cover 54 joined to the fore one by means of an oblique wall 55 (FIGS. 1 and 2). A transparent lid 56 revolving around pivot pins 57 provided on the back cover 54 is normally placed in the closed position of FIGS. 1 and 2 as a protection of the fore cover 53 and of the oblique wall 55.

Figure 3:
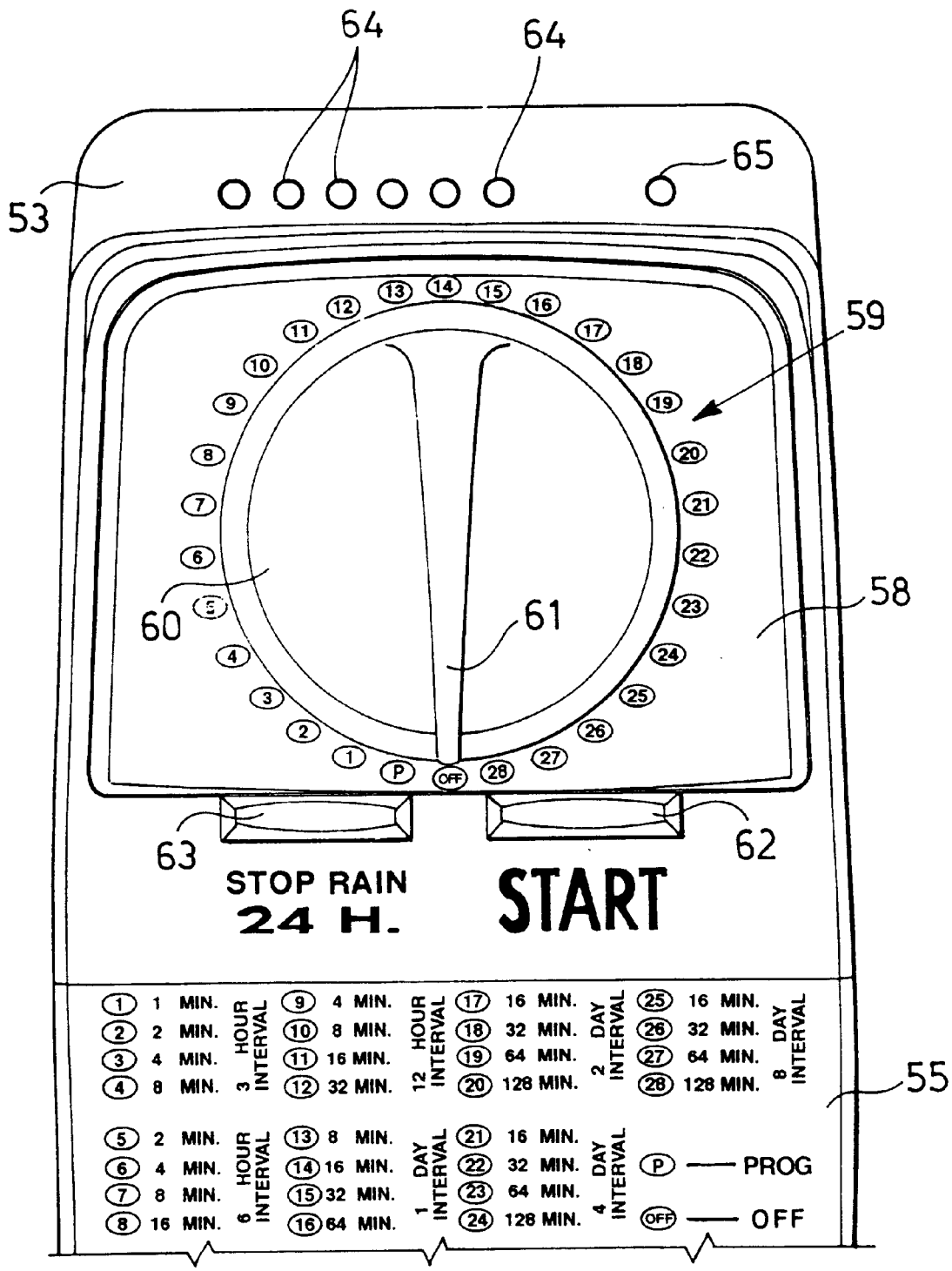
FIG. 3 shows in top plan a fore external area of the control unit, that comprises a selector of modifiable pre-set watering cycles, in an enlarged scale and with the cover removed.

On a panel 58 of the fore cover 53 a program selector 59 is rotatably located, that is formed by a turning circular knob 60 with an index 61 settable in any one of a sequence of angular positions defined by position marks 1–28 (each corresponding to a specific watering cycle), P and OFF (FIG. 3).

On the flat fore cover 53 two buttons 62 and 63 with indicating inscriptions START and STOP RAIN 24H are also provided, as also six adjacent light indicators 64 and an additional light indicator 65 at a distance from the previous ones.

On the oblique wall 55 the same position marks 1–28, P and OFF are provided, with adjacent inscriptions indicating the watering cycles corresponding to the various angular positions of the selector 59.

The selector 59 and the buttons 62 and 63 are accessible by the user by lifting the transparent lid 56 by rotation around the pivot pins 57.

As shown in FIG. 2, the knob 60 of the selector 59 has a pin 66 that passes through the flat fore cover 53 and bears a fixedly mounted small plate 67, below the cover itself, provided with a sliding contact element 68 which co-operates with an electronic circuit (non shown in details) formed by a circuit card 69 placed as a covering of a first chamber 70 defined in the fore part of the base 52 for the housing of one or more buffer cells (not shown) insertable through a lower opening with removable door 71.

The back cover 54 together with the back part of the base 52 defines in turn a second chamber 72 in which a voltage transformer 73 kept in position by angular posts 74 (FIGS. 2 and 4) is housed.

Figure 4:
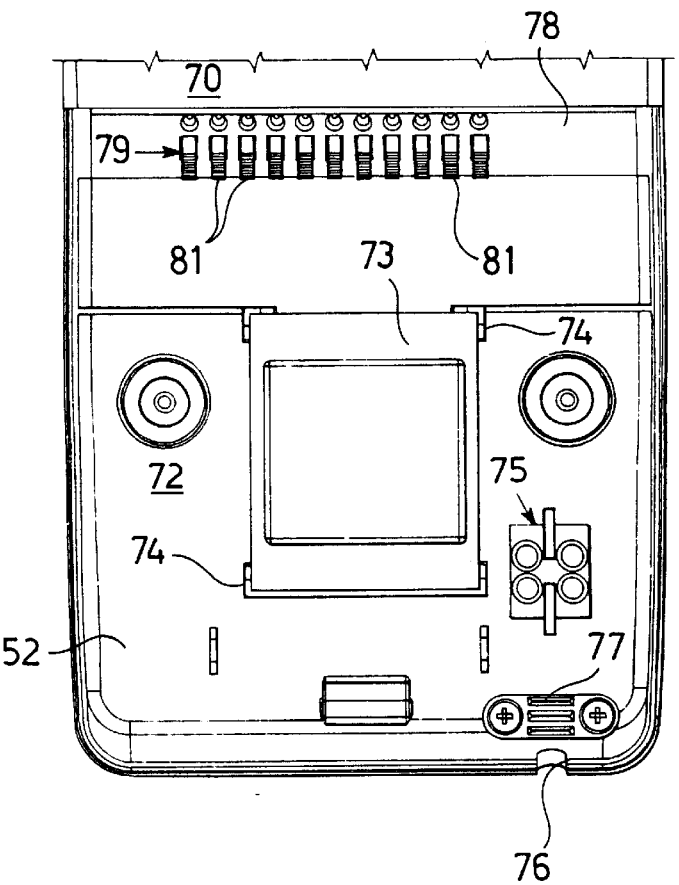
FIG. 4 shows in top plan a back internal area of the control unit, in an enlarged scale and with the cover removed.

Inside the chamber 72 a terminal board 75 is also housed (FIG. 4) suitable for the electrical connection of the transformer 73 with input electrical wires (not shown) at a mains voltage (220V), that enter the same chamber through an inlet opening 76 and are locked in their positions by a fixing over-crossing plate (FIG. 4).

The two chambers 70 and 72 are separated by a divisor septum 78, which also acts as a housing for a terminal board 79 formed by a plurality of single elastic plate terminals with activation lever 81 (FIG. 2 and 4) of the type described in the Italian patent application MI96A001563 of Jul. 25, 1996. The terminal board 79 serves the function to fix the connection electric wires (not shown) between the transformer 73 and the electronic circuit mounted on the circuit card 69 and output electric wires (not shown) of the aforementioned electronic circuit, that are connected with the actuators of the watering system to which the control unit is destined, through a lateral opening 82 on the base 52 (FIG. 2), in such a way as to provide for the command of the activation of respective water feeding lines of the system.

Figure 5:
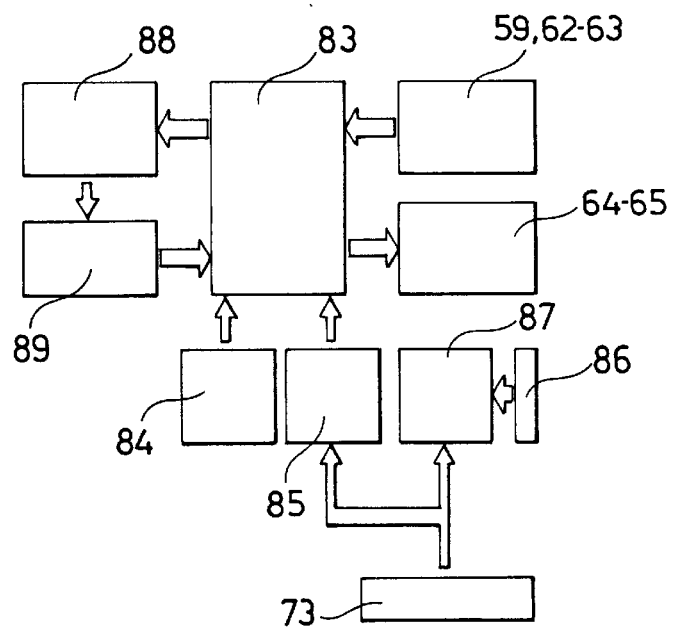
FIG. 5 shows a block diagram representing the electronic circuit of the control unit.

The electronic circuit associated with the circuit card 69 is represented in the form of a block diagram in FIG. 5 and comprises essentially a processing unit with programmable microprocessor 83 controlled by the rotary selector 59 and by the buttons 62–63 and controlling in turn the light indicators (LED) 64 and 65. In addition, the processing unit 83 is controlled by a selector 84 (not shown in the mechanical drawings), that provides for the selection of the number of exits to be controlled (for example, 4 or 6) and/or for the selection of the supply frequency (for example, 58Hz or 68Hz), and receives a low voltage alternating power supply (for example 24VAC) from the transformer 73 through a network frequency synchronism circuit 85. The transformer 73, or as an alternative a battery 86, also provides for the power supply of the electronic circuitry 87 associated with the processing unit 83.

The processing unit 83 provides for the control of a driving circuit 88 for the actuators (typically electro-valves) of the watering system, while a circuit 89 for the detection of short circuits provides for the stop of the processing unit 83, and more generally of the control unit, in the event of short circuits in the same actuators.

Because of the aforementioned conformation, the control unit of FIGS. 1–5 must simply be connected to a normal network power socket, obviously besides to the actuators of the watering system.

The various watering cycles pre-set during the stage of preparation of the microprocessor 83 are indicated on the oblique wall 55 of the control unit cover (FIG. 3). However, it is possible to modify them, as it will be described later.

Before going on with the description of the control unit complete operation, the functions of buttons 62–63 and of the light indicators 64–65, should be here considered.

The START button 62 has the following functions:
manual starting of the watering cycle pointed at by the rotary selector 59;
feeding of the watering cycle currently under course to the next exit;
start of programming when the rotary selector 59 points at the position P;
assignment of the watering time pointed at by the rotary selector 59 to the exit relative to the LED indicator currently lightened and lightening of the next indicator.

The STOP RAIN button 63 has the following functions:
setting in pause of the control unit for a period of 24 hours starting from the time in which the button is pressed;
restoring of the operation mode in the event the control unit is already in pause.

It should be noted that the STOP RAIN button will not have any effect when the rotary selector points at the OFF or the P position and during the programming stage.

The light indicator 65 concerns the power supply of mains and it operates according to the following ways:
lightened in a constant way, it indicates the presence of the mains power supply;
lightened in a slow intermittent way (for example, 0.5 sec. on, 0.5 sec. off) it indicates the absence of tension of mains and that the operation is granted by the battery.

The light indicators 64 concern the operation of the various exits connected to respective actuators of the watering system and they operate according to the following ways:
lightened in a constant way, each indicator 64 signals that the relative exit is active;
lightened in a slow intermittent way (for example, 0.5 sec. on, 0.5 sec. off) each indicator 64 signals that the respective exit is in short circuit.
lightened in a quick intermittent way (for example, 0.1 sec. on, 0.1 sec. off), each indicator 64 signals that the control unit is undergoing a stage of programming of the watering times.
lightened in a quick sequence from left to right the indicators 64 signal the state of pause.

Having premised this, the control unit can operate in AUTOMATIC, SEMI-AUTOMATIC, MANUAL, PROGRAMMING, PAUSE, OFF and ZERO HOUR modes.

The AUTOMATIC mode is the main operating mode, which allows to activate in a sequence all the available exits for the length of time (equal for all exits) indicated by the position in which the rotary selector 59 is set and at time intervals also associated with the position of the same selector.

According to this form of operation the rotary selector 59 must therefore be positioned in the angular position, to be chosen among 1–28, that corresponds to the desirable watering cycle.

In order for the cycle to be activated at once, all the light indicators 64 must be off. If one of them is lightened in a constant way, thus indicating that an exit is active, the starting of the cycle is delayed until the end of the interval subsequent to the turning off of the active exit. This can depend either on the previous starting of a cycle in SEMI-AUTO mode on request of the user, or on the fact that, as a consequence of a programming that modified the watering times, the length of the cycle turns out to be superior to the starting interval between two subsequent cycles.

It must be noted that the change in position of the rotary selector 59 interrupts a possible cycle of watering under course.

For the SEMI-AUTO operation mode it is necessary to position the rotary selector 59 again in one of the angular positions 1–28. No exit indicator 64 must be flashing in a quick way or be lightened in a fix way.

The START button 62 is then pressed once, and it allows to start, upon command of the user, a complete watering cycle that provides to activate in a sequence all the available exits for the length of time (equal for all exits) indicated by the position in which the rotary selector is set and with time intervals also associated to the angular position of the same selector.

At the start of the MANUAL mode at least one light indicator of an exit 64 is lightened in a fix manner. The START button 62 is then pressed one or more times. This allows to turn off the exit currently on and to activate the immediately subsequent one, and so on until all the available exits are run. Unless the START button is pressed ahead of time, the time length of the activation of the actuator currently in function is the one indicated by the position of the rotary selector 59.

The PROGRAMMING mode allows to associate the single exits with watering cycles different from the pre-set one. To this purpose it is necessary to position the rotary selector 59 on P and to press the START button 62 once. With one of the light indicators 64 lightened in an intermittent quick way as to signal that a programming stage is running, the rotary selector 59 is then moved to one of the angular positions 1–28 and the START button is pressed again. This allows to associate the exit relative to the light indicator 64 currently being lightened in a flashing quick manner with the time length of the activation indicated by the new position of the rotary selector at the time in which the START button is pressed again. By repeating the same operation for the other exits, each exit can thus be set for the AUTOMATIC operation with a time length different from the ones indicated by the rotary selector 59.

By pressing the START button during the PROGRAMMING mode with the rotary selector 59 in the position P or OFF a possible programmed time length associated with the relative exit gets cancelled, restoring the time lengths indicated by the rotary selector.

Once having entered the PROGRAMMING mode, it is possible to exit it in two ways:

pressing the START button until all the exit indicators 64 are turned off;

automatically at the mode moment of the automatic starting of the subsequent cycle.

For the PAUSE mode it is necessary to position the rotary selector 59 in one of the positions from 1 to 28, making sure that no exit indicator 64 is flashing in a quick way. The RAIN STOP button 63 must then be pressed once. This allows to stop the watering for 24 hours since the time when the RAIN STOP button was pressed and therefore the exit indicators 64 lit in a quick sequence. Once in the PAUSE mode the watering can be restored by pressing the RAIN STOP button again.

The PAUSE mode is terminated when operating in the PROGRAMMING and OFF modes.

In order to activate the OFF mode the rotary selector 59 has to be positioned in the angular position OFF. In this way, all the exits are disabled and no additional watering cycle is permitted.

The mode ZERO HOUR is activated by pressing the two buttons START 62 and RAIN STOP 63 simultaneously. In this way the time in which this operation is performed is set as the starting time for the count of the watering intervals.

It must be noted that the initialisation of the "0" hour also occurs automatically when the electronic control unit is connected to the power supply, either of mains or battery.

What is claimed is:

1. An electronic control unit for sequentially controlling a plurality of watering lines in an automatic watering systems, comprising:

an electronic circuit with a programmable processing unit and a manually operated rotary selector provided with a plurality of selectable watering positions corresponding to respective watering cycles each having start time and watering length pre-set by the processing unit and, in addition, with a selectable program changing position, and a start button, wherein said start button and said rotary selector are combined so that activation of the start button with the rotary selector in said program changing position allows access to a programming mode for memorizing different watering lengths for each watering line of the watering system.

2. The electronic control unit according to claim 1, wherein said programmable processing unit provides for an AUTOMATIC operation mode, that is activated by setting the selector in one of said selectionable positions and causes the sequential activation of all the lines according to the watering cycle corresponding to the position of the selector.

3. The electronic control unit according to claim 1, wherein said programmable processing unit provides for a SEMI-AUTOMATIC operation mode, that is activated by setting the selector in one of said selectionable positions and by then actuating a start button and causes the sequential activation of all the lines according to the watering cycle corresponding to the position of the selector.

4. The electronic control unit according to claim 1, wherein said programmable processing unit provides for a MANUAL operation mode, that is activated by setting the selector in one of said selectionable positions and by then actuating, for each watering line, a start button that causes the activation of said line according to the watering cycle corresponding to the position of the selector.

5. The electronic control unit according to claim 1, wherein it comprises a stop button for stopping the watering cycle under course.

6. The electronic control unit according to claim 1, wherein it comprises a plurality of light indicators suitable to signal the condition of operation of the lines being controlled.

7. The electronic control unit according to claim 1, wherein it comprises a light indicator suitable to signalise the presence or absence of a mains power supply.

8. The electronic control unit according to claim 1, wherein said selector is settable in a pre-fixed position, different from said selectionable positions, in which all the watering lines are turned off.

9. The electronic control unit as set forth in claim 1, wherein the programming mode provides that each different watering length of the watering lines corresponds to a combination of a specific selectable watering position in which the rotary selector is subsequently set with a further activation of the start button.

* * * * *